United States Patent

[11] 3,556,461

| | | |
|---|---|---|
| [72] | Inventor | Robert K. Little |
| | | Mount Holly, N.J. |
| [21] | Appl. No. | 717,302 |
| [22] | Filed | Mar. 29, 1968 |
| [45] | Patented | Jan. 19, 1971 |
| [73] | Assignee | RKL Controls, Inc. |
| | | Hainesport, N.J. |
| | | a corporation of New Jersey |

[54] PINCH-TYPE VALVE
5 Claims, 8 Drawing Figs.

[52] U.S. Cl.............................................. 251/5
[51] Int. Cl.............................................. F16k 7/07
[50] Field of Search.................................. 251/42, 61.1

[56] References Cited
UNITED STATES PATENTS
2,558,152   6/1951   Perkins.................... 251/5X FOREIGN PATENTS
| | | | |
|---|---|---|---|
| 142,472 | 7/1935 | Austria........................... | 251/5 |
| 506,237 | 10/1951 | Belgium........................ | 251/8 |
| 513,821 | 9/1952 | Belgium........................ | 251/5 |
| 546,891 | 8/1956 | Italy............................... | 251/5 |

Primary Examiner—William F. O'Dea
Assistant Examiner—Richard Gerard
Attorney—Howson and Howson ABSTRACT: A pressure fluid actuated pinch-type valve of substantially oval cross section having a width substantially exceeding its height and having a relatively short face-to-face length. A flanged resilient valve body is fitted within a flanged oval-sectioned housing having spheroidal end portions permitting lateral expansion of the valve body during pressure fluid closure thereof. The semicircular end walls of the resilient valve body each include a longitudinal tapered protruding portion on the exterior and an opposed coextensive depression on the interior thereof to permit the fluidtight two-lobe sealing of the valve body in the closed position of the valve.

PATENTED JAN 19 1971

INVENTOR:
ROBERT K. LITTLE
BY Howson & Howson
ATTYS.

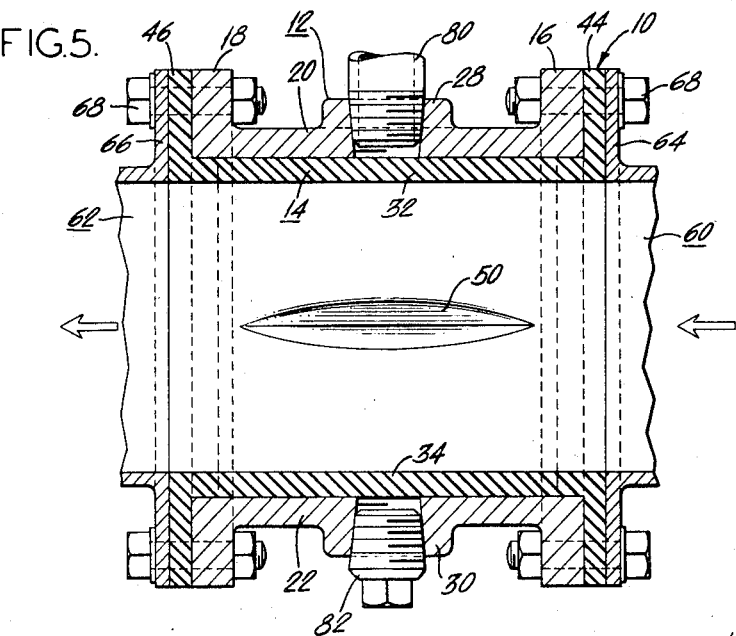
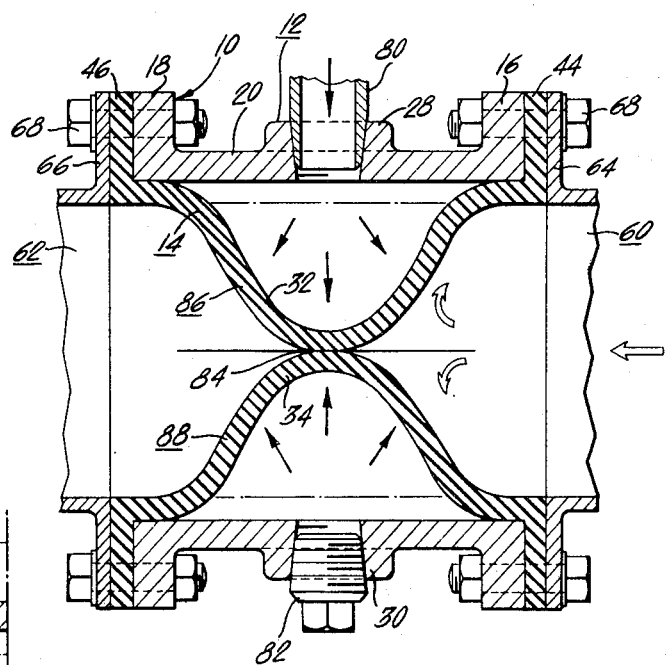
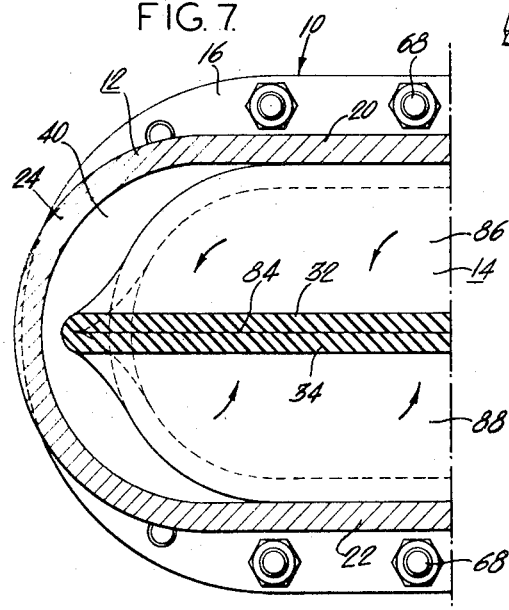

PINCH-TYPE VALVE

The present invention relates generally to pressure fluid actuated pinch-type valves and relates more particularly to a valve of this type having a substantially oval cross section in its open position, with a width substantially in excess of its height and which, due to the valve body construction, is adapted to close in a fluidtight manner.

Pinch-type valves have been widely employed to control the flow of such diverse products as dry abrasive granular materials and corrosive fluids. The popularity of this type of valve stems from its simplicity, smooth-walled flow path, ability to govern flows of fluid, solid, or mixed solid and fluid materials, and adaptability for remote operation. Pinch-type valves may be used for either vacuum or pressure service and may be built in practically any size required.

Prior to the present development, pinch-type valves have been restricted almost exclusively to a valve having a substantially circular cross section. There are, however, many applications in which a valve of this type would preferably have a width in excess of its height. For example, in regulating the flow of bulk materials from a hopper onto a conveyor, the material is in most situations desirably deposited from the valve across the full width of the conveyor. Another example wherein the valve width must substantially exceed its height is in the control of ventilating air in forced-air building heating systems. Since the air ducts are in the majority of installations of a flat, rectangular cross section, the flow regulating valve for such systems must likewise be of a corresponding shape.

The major problem in the development of a pinch-type valve having a noncircular shape is the configuring of the ends of the valve body and of the valve housing in such a manner that the valve body will tightly close under fluid pressure. If a semicircular valve body end in an oval valve embodiment were subjected to air pressure, the valve end would close in a three-lobe configuration and leakage would occur at the point where the angles of the three lobes come together. The three-lobe closure, which cannot produce a fluidtight seal, results from the simultaneous inward movement of the semicircular end wall as well as the top and bottom portions of the valve body. It is an important aspect of the present invention to provide means preventing the inward folding of the end wall under pressure.

In the present invention, the desired seal is obtained by forming the valve housing ends in a spheroidal shape to permit a lateral outward expansion of the resilient vale body during closure thereof. The ends of the valve body, which otherwise have a uniform semicircular section, are formed with an elongated tapered protruding portion extending along the transverse center line of the exterior thereof opposed from and equal in degree to a corresponding depression or recess in the interior wall of the valve body. This configuration of the valve body end wall initiates the outward folding of the wall upon application of fluid pressure to thereby close the valve body in a two-lobe tightly sealed configuration.

In view of the foregoing, it can accordingly be understood to be a first object of the present invention to provide a pressure fluid actuated pinch-type valve having a substantially oval flow cross section which may be closed to form a fluidtight seal.

Another object of the invention is to provide a valve of the type described having a valve housing and valve body configuration which provides a fluidtight seal along a straight line extending the complete width of the valve body.

A further object of the invention is to provide a valve body for an oval-shaped valve including means providing a two-lobe closure thereof upon application of fluid pressure to the valve.

An additional object of the invention is to provide an oval pinch valve as described having a relatively short face-to-face length and which may be fabricated in any desired width.

Still another object of the invention is to provide a valve of the type described of a relatively simple construction which may be inexpensively manufactured.

Additional objects and advantages of the invention will be more readily apparent from the following detailed description of an embodiment thereof when taken together with the accompanying drawings in which:

FIG. 3a is an enlarged view of the circled area of FIG. 3;

FIG. 5 is an enlarged sectional view taken along line 5-5 of FIG. 1 showing the valve in the open position;

FIG. 6 is a view similar to FIG. 5 showing the valve in the fully closed position; and FIG. 7 is a view similar to FIG. 3 showing the valve in the fully closed position.

Figure 1:
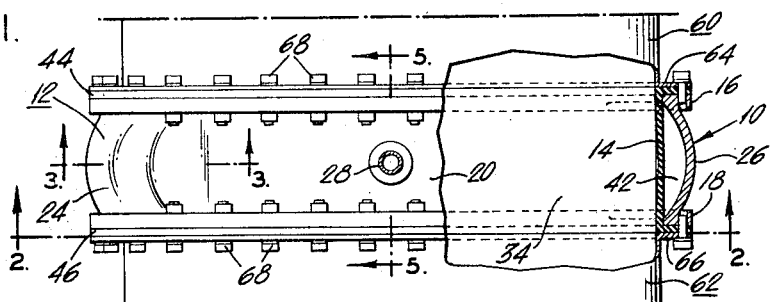
FIG. 1 is a plan view of a pinch-type valve embodying the present invention shown mounted in an oval-shaped duct and partly broken away to show the resilient valve body therewithin.

Referring to the drawings, the present invention is embodied in a valve generally designated 10 which comprises a valve housing 12 and a valve body 14 mounted therewithin. The housing 12, which is preferably a one-piece metal casting, is of a hollow, generally oval shape and includes outwardly extending apertured flanges 16 and 18 defining the parallel faces thereof. In the substantially oval configuration of the valve, the top and bottom portions 20 and 22 of the housing are parallel and are connected by end portions 24 and 26 which are of a substantially spheroidal shape to provide adequate room for lateral expansion of the valve body as will be discussed more fully below. Threaded ports 28 and 30 in the top and bottom portions 20 and 22 respectively of the housing permit connection of actuating and control elements as will be presently described.

Figure 4:
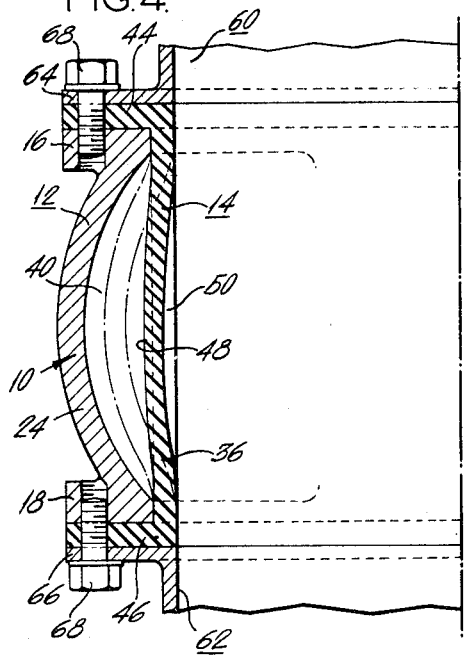
FIG. 4 is a sectional view taken along line 4-4 of FIG. 3.

The valve body 14, which is fabricated of a resilient material such as gun rubber, is of the same hollow substantially oval shape as the housing 12 and includes parallel top and bottom portions 32 and 34 connected by semicircular end portions 36 and 38. In the open valve position as shown in FIG. 5, the top and bottom portions 32 and 34 of the valve body are adapted to seat against the top and bottom portions 20 and 22 of the housing. However, as shown in FIG. 4, the valve body end portions 36 and 38 are seated against the corresponding end portions 24 and 26 of the housing at the flanged housing faces only, the substantially spheroidal shape of the housing end portions forming expansion chambers 40 and 42 respectively between the valve body and housing end portions. The valve body includes out-turned flanges 44 and 46 around the entire periphery of each face thereof, the flanges adapted to overlie the flanges 16 and 18 of the housing and having bolt apertures corresponding with the apertures thereof.

Figure 3:
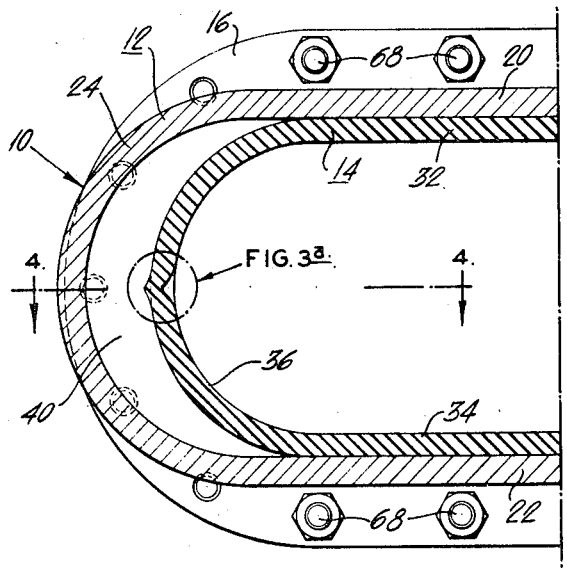
FIG. 3 is an enlarged view taken along line 3-3 of FIG. 1 showing the configuration of the ends of the valve body and housing.
Figure 3:
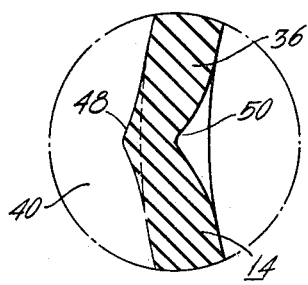

As shown most distinctly in FIGS. 3, 4 and 5, each of the end portions 36 and 38 of the valve body is provided with a central longitudinal elongated tapered protruding portion 48 on the exterior thereof and an opposed coextending, correspondingly tapered recess or depression 50 on the interior thereof. Said protruding portion and depression are generally wedge shaped and extend approximately two-thirds of the length of the portions, being most prominent at the center thereof and tapering smoothly into the surface of the end portions toward the faces of the valve body. The wall thickness of the end wall is preferably reduced in the region of the protruding portion and depression to about 75 percent of the normal thickness as illustrated in FIG. 3a although this is not essential. The protruding portion and depression play an important role in the proper sealing of the valve body upon fluid pressure closure thereof as will be discussed in detail herebelow.

The valve embodiment illustrated is shown mounted in an oval conduit having conduit members 60 and 62 connected by the flanges 64 and 66 to the opposed flanged faces of the valve by means of bolts 68. As shown in FIGS. 3 and 4, due to the substantially spheroidal shape of the valve housing end portions the housing flange apertures adjacent the end portions are threaded to receive the bolts. As shown in FIGS. 4 and 5, the mounting of the valve between the conduit members 60 and 62 secures the valve body in sealing relation between the flanges of the conduit members and the housing, and forms a fluidtight pressure chamber between the valve body and housing. The valve in the open position forms a smooth-walled passage with the conduit members 60 and 62.

Figure 2:
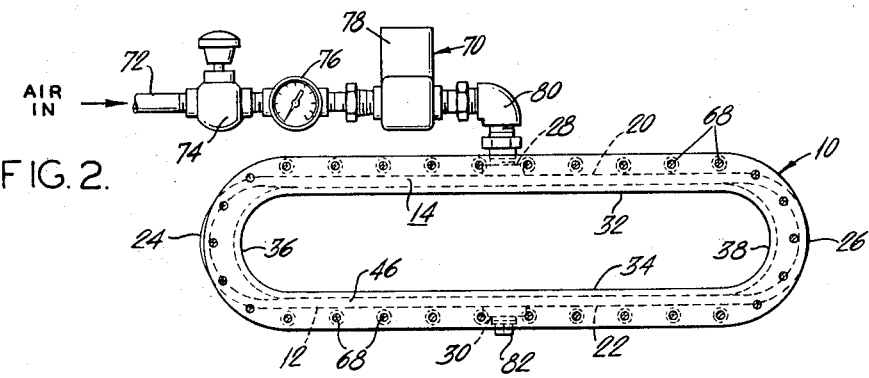
FIG. 2 is a sectional view taken along line 2-2 of FIG. 1 showing the oval shape of the valve aperture in the open position.

As shown in FIG. 2, a pressurized fluid in this instance compressed air, is introduced into the housing port 28 by the valve control means generally designated 70 which receives compressed air from a compressor or other suitable source (not shown) through a conduit 72. The control means includes a pressure regulating valve 74, a pressure gauge 76 and an electrically controlled three-way valve 78 downstream of the regulating valve and pressure gauge which is connected to the port 28 by the conduit 80.

With the housing port 30 closed by a plug 82, the valve may be actuated by control of the three-way valve 78 which regulates the pressure in the valve housing acting on the valve body. By adjusting the pressure regulating valve to provide a suitable actuating pressure considering the nature and pressure of the material passing through the valve, actuation of the three-way valve to pressurize the valve housing will close the valve body in the manner illustrated in FIGS. 6 and 7 wherein it may be seen that the top and bottom portions 32 and 34 of the resilient valve body are displaced into abutting sealing contact along a straight transverse sealing line 84 which extends the full width of the valve body. As shown in FIG. 7, the sealing line 84 at the valve body end starts from the depression 50 in the valve body end wall. The depression 50, protruding portion 48 and, in the present embodiment, the reduced wall thickness therebetween constitute means serving to initiate an outward transverse fold of the valve body ends upon closure thereof to achieve the configuration shown in FIG. 7. The valve body thus closes in two lobes 86 and 88 as shown in FIG. 6 which engage in the fully closed position along the sealing line 84. It will be seen in FIG. 7 that the spheroidal shape of the housing at the housing end portions provides suitable room for transverse expansion of the valve body during closure so that the valve body even in the fully closed position illustrated does not contact the end portions of the housing.

With the present valve construction, there is no limit as to the width of the valve and it can accordingly be utilized for regulating flow through conduits having relatively large widths with respect to their heights. The face-to-face length of the valve may as illustrated be relatively short and need not be increased with an increase in the valve width.

While emphasis has been placed on the sealing closure capabilities of the valve, it should be understood that by appropriate control of the three-way valve, the present pinch valve may be partially closed to meter flow therethrough.

The valve body may if desired be fabric reinforced particularly in the flange region in a manner well known in the art to achieve the required strength. For extremely high-pressure applications, it may be desirable to extend such fabric reinforcing throughout the valve body.

From the above description, it can be understood that the present pinch valve can be utilized in any application in which a completely fluidtight valve closing is necessary. Two such valves may, for example, be utilized to form an air lock between spaced flow channels or compartments.

Manifestly, changes in details of construction can be effected by those skilled in the art without departing from the spirit and the scope of the invention as defined in and limited solely by the appended claims.

I claim:

1. A resilient valve body for a fluid pressure actuated pinch valve having a substantially oval-shaped flow passage cross section throughout its length, said valve body having a hollow substantially oval configuration including parallel top and bottom portions connected by semicircular end portions, flange means for securing the valve body oval faces to the faces of a valve housing in sealing relation therewith, and means for providing an outward folding movement of the valve body end portions upon application of a fluid pressure to the valve body in a valve housing, said latter means comprising a tapered elongated protruding portion extending longitudinally on the exterior of each end portion and an opposed coextending depression on the interior of each end portion, the thickness of said valve body being reduced between each said protruding portion and the corresponding depression.

2. A pressure fluid actuated pinch valve comprising a hollow valve housing having a substantially oval cross-sectional shape, a hollow resilient valve body having a corresponding oval configuration throughout its length disposed within said housing and defining an oval-shaped flow passage therethrough, said valve body adapted to be secured in sealing relation within said housing to form a circumferential pressure fluid chamber therebetween, means for admitting a pressurized fluid to said pressure fluid chamber to resiliently deform said valve body thereby closing said flow passage, means on the end portions of said valve housing permitting unrestricted transverse outward expansion of the valve body end portions during closure of the valve, and means on said valve body end portions causing an outward folding movement of said end portions during pressurization of said pressure chamber thereby providing a fluidtight closure of said valve body along a straight seal line, said latter means comprising a tapered elongated protruding portion extending longitudinally on the exterior of each valve body end portion and an opposed coextending depression on the interior of each said end portion, said valve body having an area of reduced thickness in each said end portion.

3. A pressure fluid actuated pinch valve as claimed in claim 2 wherein the thickness of said valve body is reduced between each said protruding portion and the corresponding depression.

4. A pressure fluid actuated pinch valve comprising a hollow valve housing having a substantially oval cross-sectional shape, a hollow resilient valve body having a corresponding oval configuration throughout its length disposed within said housing and defining an oval-shaped flow passage therethrough, said housing and valve body each having parallel top and bottom portions, the top and bottom portions of the valve body respectively adjoining the top and bottom portions of the valve housing in the open valve position, outwardly directed flanges on the oval faces of said valve housing, outwardly directed flanges on the oval faces of said valve body adapted to overlie said valve housing flanges in close fitting sealing relation to form a circumferential pressure fluid chamber between the housing and valve body, means for admitting a pressurized fluid to said pressure fluid chamber to resiliently deform said valve body thereby closing said flow passage, means on the end portions of said valve housing permitting unrestricted transverse outward expansion of the valve body end portions during closure of the valve, and means on said valve body end portions causing an outward folding movement of said end portions during pressurization of said pressure chamber thereby providing a fluidtight closure of said valve body along a straight seal line, said latter means comprising a tapered elongated protruding portion extending longitudinally on the exterior of each valve body end portion and an opposed coextending depression on the interior of each said end portion, said valve body having an area of reduced thickness in each said end portion.

5. A pressure fluid actuated pinch valve as claimed in claim 4 wherein the thickness of said valve body is reduced between each said protruding portion and the corresponding depression.